Nov. 17, 1970   E. S. ISSENMANN ET AL   3,540,073
MOBILE DUST AND DEBRIS COLLECTION AND INERTIAL
DUST SEPARATOR FOR AIRPORT RUNWAYS
AND/OR STREET CLEANING
Filed Feb. 19, 1969   5 Sheets-Sheet 1

INVENTORS
EDWARD S. ISSENMANN
ROGER A. MILLER
BY
Harry A. Herbert Jr.
and
Charles H. Wagner
ATTORNEYS

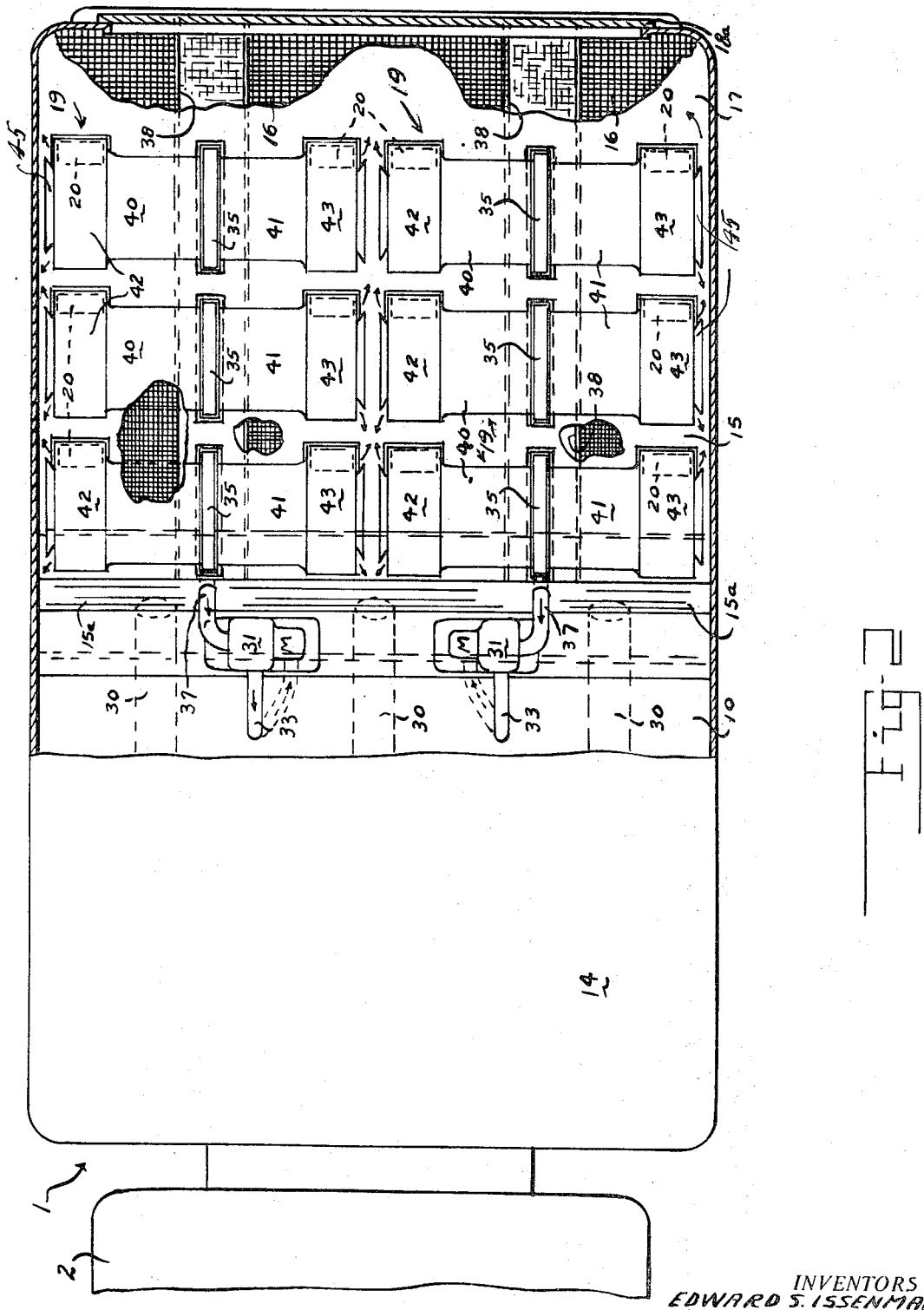

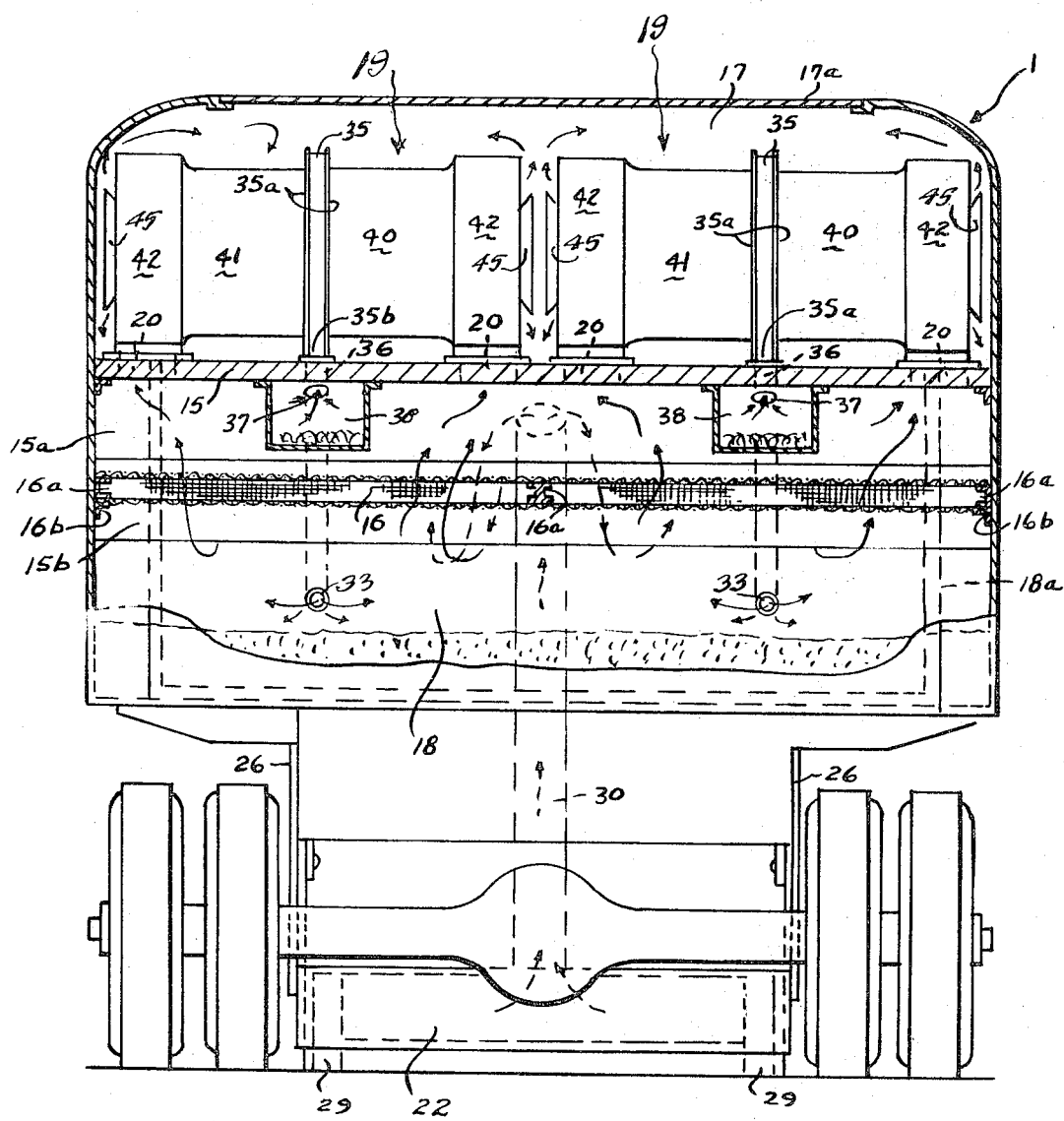

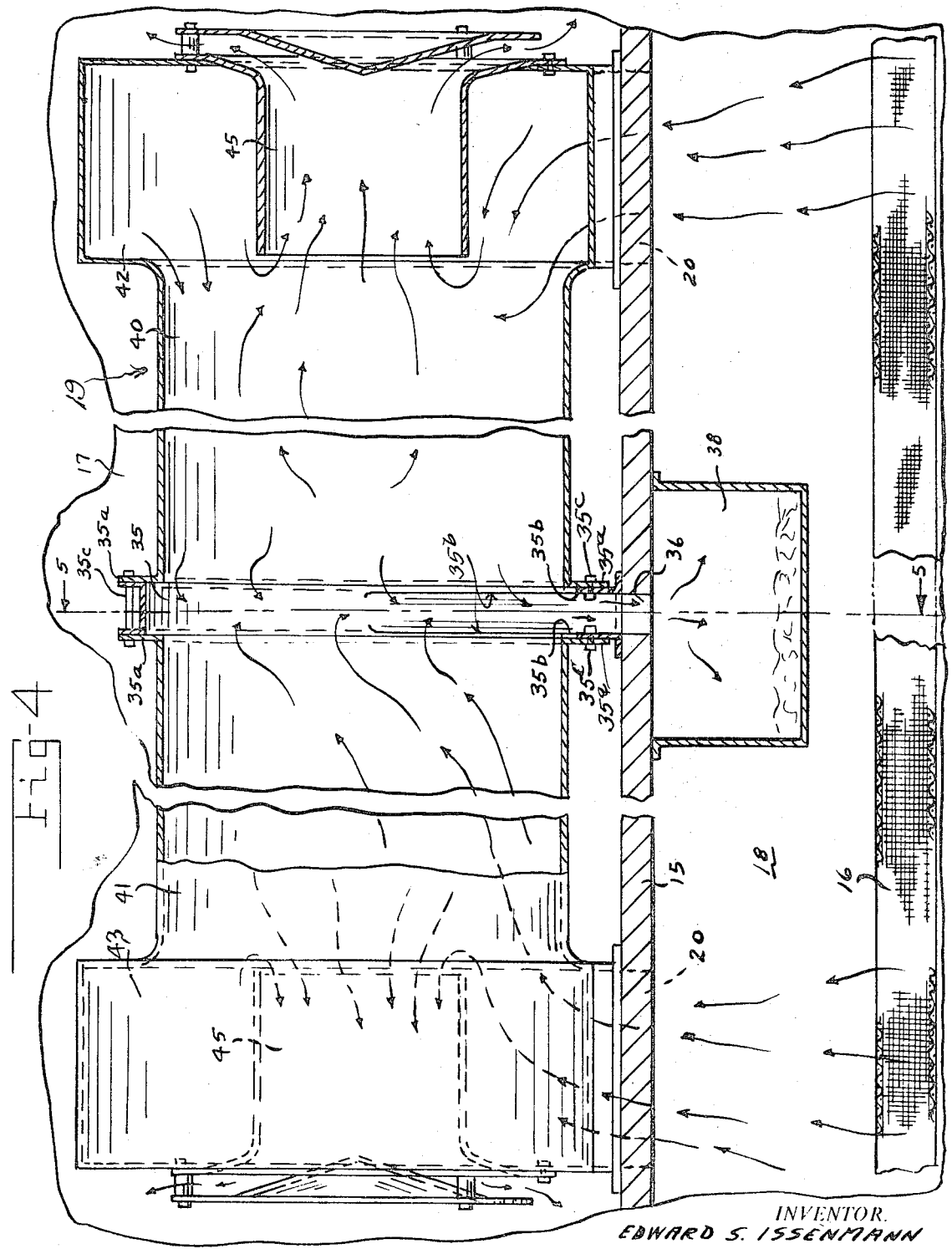

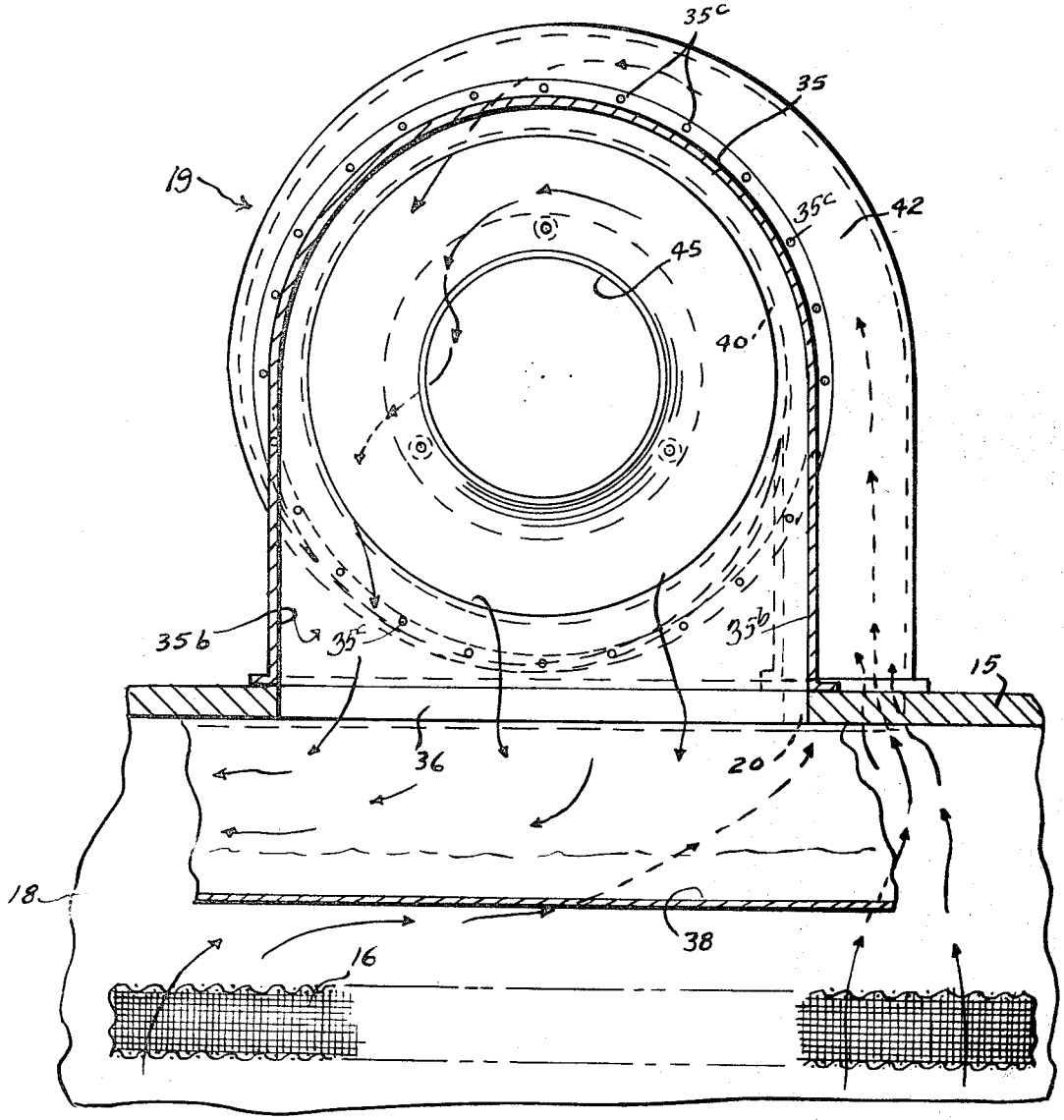

United States Patent Office 3,540,073
Patented Nov. 17, 1970

3,540,073
MOBILE DUST AND DEBRIS COLLECTION AND INERTIAL DUST SEPARATOR FOR AIRPORT RUNWAYS AND/OR STREET CLEANING
Edward S. Issenmann, Kettering, and Roger A. Miller, Dayton, Ohio, assignors to the United States of America as represented by the Secretary of the Air Force
Filed Feb. 19, 1969, Ser. No. 800,646
Int. Cl. E01h 1/08
U.S. Cl. 15—340          7 Claims

ABSTRACT OF THE DISCLOSURE

A runway and street surface cleaner and inertial dust separator mounted on a mobile support has an upper closed low-pressure compartment with an engine driven exhaust device exhausting air from said compartment, and includes a closed lower debris and dust collection chamber below the low-pressure compartment with an inertial dust separator supporting partition or floor between the compartment and chamber. A debris and dust delivery conduit has an upper discharge end opening into the front end of the collection chamber immediately below the partition, with a dust and debris deflecting panel projecting downwardly from the front end of the partition in spaced relation to the delivery conduit discharge opening which deflects debris, dust and heavier particles downwardly into the chamber. A dust and debris pickup suction unit is carried by the mobile support to traverse the surface being cleaned and is connected to the lower end of the debris and dust delivery conduit. A plurality of side by side pairs of aligned cylindrical inertial dust separators are mounted on the platform in the low-pressure compartment, above the debris and dust collection chamber. Spaced dust and air mixture discharge conduits extend upwardly from the collection chamber through the partition and discharge tangentially into the opposite ends of each inertial dust separator and whirl introduced dust and smaller received particles centrifugally around the inside of the opposite ends of the separators and move the same axially toward each other to the centers thereof, throwing the dust and heavier particles outward while discharging a cleaner central column of air out through central openings in the opposite ends of each separator, induced by the relative low-pressure in the surrounding compartment. A semicircular heavier particle and dust collecting trough is fixed in periphery of each cylindrical separator substantially midway between its opposite ends and is formed with a wide semicircular dust and heavier particle discharge conduit or passage therefrom which opens downwardly through the lower half of the periphery of the separators and through the partition into the debris and dust collection chamber. An elongated closed dust and small particle collecting trough is fixed in the top of the chamber against said portion and extends under the dust and heavier particle discharge conduits from the semicircular dust collecting troughs in the separators. The troughs are each closed at their front ends by the deflecting panel and at their opposite rear ends by a removable closure member at the rear end of the mobile support which also closes the rear end of the debris and dust collecting chamber. A rectangular frame screen extends completely across the collecting chamber immediately below the dust and small particle collecting troughs and between the deflecting panel at one end and the removable closure member at its opposite end. Suction pump means are fixed in the low-pressure compartment and suction conduits therefrom open into the front ends of each elongated dust and small particle collecting trough while a discharge conduit from each pump opens into the front end of the collecting chamber below the rectangular dust screen and recirculates dust withdrawn from the troughs back into said chamber, and through the rectangular frame dust screen back tangentially into the opposite ends of the inertial separators.

BACKGROUND OF THE INVENTION

Existing runway surface cleaners and dust debris separators of the vacuum type usually employ porous cloth bags for dust control and have many disadvantages, among which are, that the bags need periodic replacement, require cleaning, cannot be used in damp or wet weather and are bulky, expensive, easily damaged, and considerable loss of time and loss of the use of the cleaner occurs during bag replacement.

FIELD OF THE INVENTION

The invention comprises a mobile surface cleaner of the vacuum or suction operated inertia type for use on airport runway surfaces and streets, or similar large surface cleaning and dusting operations to remove dust, small objectionable particles, and debris from the surface being cleaned which might otherwise damage aircraft or aircraft landing equipment during the landing or takeoff operations thereof.

SUMMARY OF THE INVENTION

The invention is an important and novel improvement over our co-pending patent application for "Installation of Inertial Dust Filter on Airport Runway and/or Street Cleaning Equipment," Ser. No. 729,330, filed May 15, 1968, by Roger A. Miller and Edward S. Issenmann which incorporates generally a somewhat analogous structure but incorporate improvements including a pair of closed elongated trough members which extend longitudinally under the dust and small particle discharge conduit outlets from each group of the side by side inertial separators, in which the trough members are closed at both ends to retain the smaller and heavier particles discharged thereinto from an improved semicircular dust receiving trough member in the periphery of each cylindrical separator barrel portions and is located midway between their ends. A rectangular frame screen member is supported in the lower or dust and debris collection chamber below the bottom of the troughs and extends completely across the chamber between the opposite sides and opposite ends thereof, with the front end of the frame disposed against the coarse particle deflecting panel and the rear end against the "clean-out" door at the rear end of the chamber. A suction or vacuum pump is provided for each of the trough members and is mounted in the upper or low-pressure compartment in front of each group of the side by side inertial separators each with a suction intake conduit extending from the intake sides of the pumps having a dust intake opening, which opens into the front end of each trough, while discharge conduits extend downwardly from the exhaust or outlet sides of the pumps and discharge into the dust and debris collection chamber below the rectangular frame dust screen member.

The semicircular discharge troughs in the periphery of the middle portions of the inertial separators are wider than the internal diameter of the semicircular dust and small particle collecting troughs, and similar width downwardly extending passages therefrom extend through the inertial separator supporting partition or floor to discharge into the closed troughs between the sides thereof. The wide discharge openings prevent any restriction to the discharge of the separated dust and small particles from the semicircular dust and small particle collection troughs in the separator barrels or cylinders. The full length and width frame screen members located below the bottoms of the closed troughs screen the tangential dust receiving inlets in the opposite ends of the inertial separator cylinders, also prevent clogging and the entrance of "small" particles, that are greater than a predetermined size, from entering the tangential separator inlet openings. Finer dust particles are withdrawn from the closed troughs and recirculated by the vacuum pumps through the rectangular frame screen, while the larger, heavier particles remain in the troughs. The larger objectionable debris picked up by the suction nozzles are deflected downwardly toward the bottom of the chamber and cannot pass through the screen. When it is desirable to clean, or remove the debris, smaller particles, and dust the rear door closure member at the rear end of the chamber is opened to provide cleaning access to the interior of the elongated troughs, top of the rectangular screen, and the dust collecting portion of the lower chamber. If the body is fixed on a dump truck and raised, with the door closure member released, the entire contents of the longitudinal troughs, particles on the rectangular screen, and the separated debris and dust collected in the lower portion of the chamber can be simultaneously dumped by gravity from the mobile support.

Other objects and advantages of the invention will become apparent from the following description and accompanying drawings, in which like reference characters refer to like parts in the several figures.

BRIEF DESCRIPTION OF THE DRAWING

FIG. 2 is a horizontal sectional view taken about on the plane indicated by line 2—2 in FIG. 1, showing a portion of the top of the closed low-pressure compartment broken away to disclose two groups of aligned side by side inertial separators in elevation, and portions of the supporting partition for the separators broken away to show portions of the elongated closed trough members, and portions of the rectangular frame screen member which are under the trough members.

FIG. 3 is a vertical cross-sectional view taken about on the plane indicated by line 3—3 in FIG. 1, looking in the direction of the arrows.

FIG. 4 is a fragmentary vertical sectional view taken about on line 4—4 of FIG. 1, showing one of the inertial separators (broken away to foreshorten) and its associated elongated closed dust and heavier particle receiving trough with the improved semicircular inertial dust collector and wide discharge conduit or passage therefrom into the trough, with the rectangular frame screen in the chamber below the troughs.

FIG. 5 is a fragmentary transverse sectional view taken about on line 5—5 of FIG. 4, looking in the direction of the arrows, parts of the trough and screen being broken away.

DESCRIPTION OF THE PREFERRED EMBODIMENT

Figure 1:
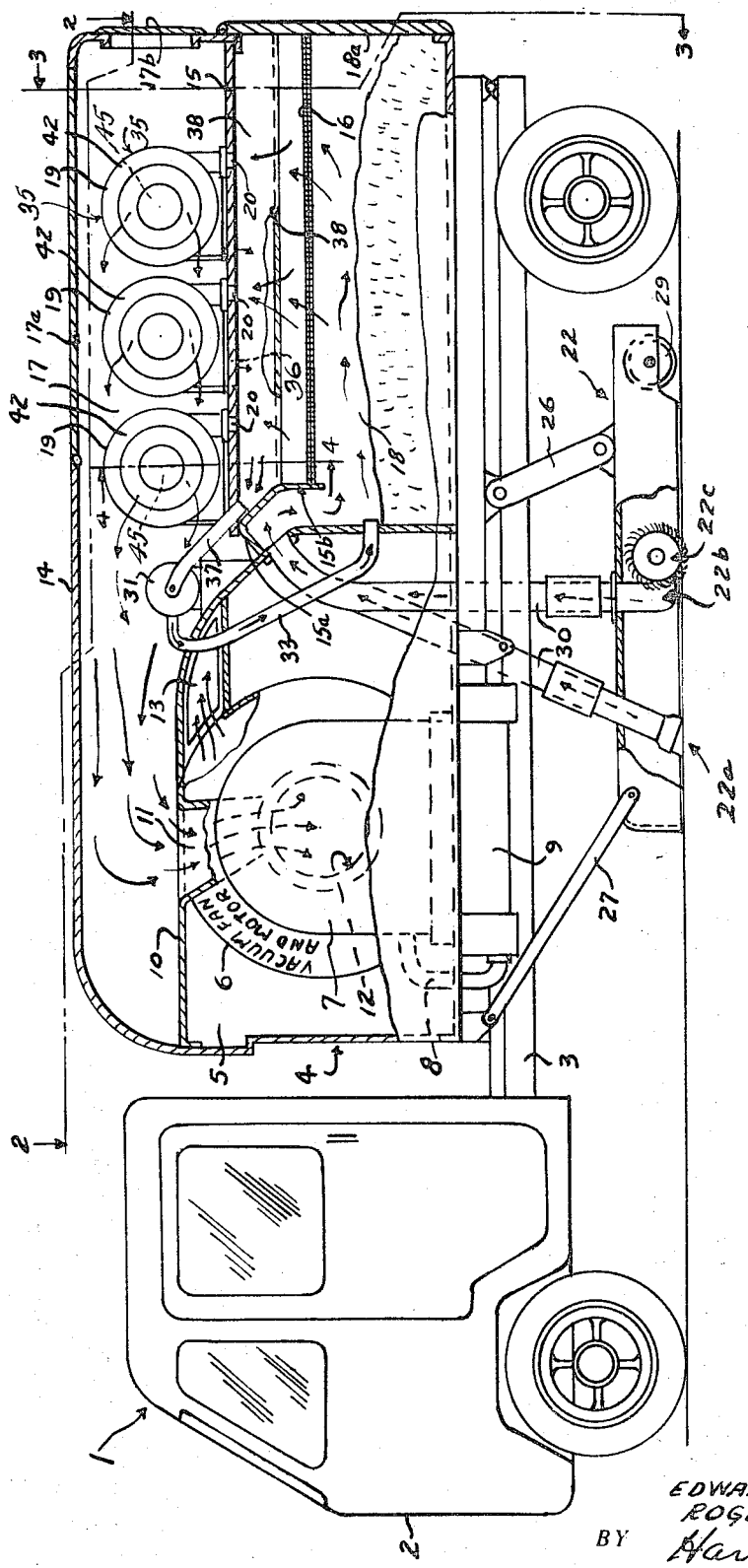
FIG. 1 is a vertical longitudinal sectional view through an improved mobile inertial dust separator for airport runways, and/or street cleaning equipment, illustrating the invention, with portions thereof shown in elevation.

Referring to the drawings and more particularly to FIG. 1, the reference numeral 1 denotes a mobile support, preferably in the form of a somewhat conventional motor driven truck or chassis having a cab 2 for the driver, and a supporting frame 3 on which the improved airport runway or surface cleaner, incorporating the invention, is mounted or carried.

The improved inertial debris and dust separator of the invention comprises a closed housing, indicated generally at 4, having a closed forward compartment 5 containing a motor driven vacuum or suction fan unit 6 driven by a suitable power plant such as a gas engine 7 having an exhaust pipe and muffler 8 and 9.

The upper portion of the partition 10 surrounding the motor and suction fan has a suction inlet passage 11 leading downwardly into the central suction inlet 12 of the vacuum fan casing.

The discharge from the suction fan 6 is exhausted to the exterior of the housing 4 by any suitable exhaust conduits or ports, such as side exhaust ports 13 in the opposite side walls of the fan and motor compartment 5.

A horizontal platform or supporting partition 15, together with a downwardly extending stone and debris deflector 15a, 15b, and the aforementioned partition 10 divides the closed housing into an upper low-pressure compartment 17 from which air is withdrawn by the suction fan 6 through the inlet 11, and a lower debris and dust receiving and collection chamber 18.

Mounted in the low-pressure compartment 17 on the supporting platform or partition 15, are aligned pairs of side by side inertial dust separators indicated generally at 19 and shown in more detail in FIGS. 4 and 5.

A suction unit or head 22 is carried by the mobile support 1 between the front and rear wheels thereof and extends transversely under the body 2 substantially from side to side thereof to transverse the surface to be cleaned as the device moves over the surface. The suction unit 22 may contain a heavy particle and dust collection nozzle 22a and a lighter particle and dust collection nozzle 22b, together with the rotary or dust agitating brush 22c. The suction nozzle is preferably carried on links 27 and 26, and suitable rollers 29 are provided to maintain the desired close clearance with the surface being cleaned.

Suitable debris, dust and air suction conduits 30 are connected in communication with the suction nozzles 22a and 22b and extend upwardly through the exhaust fan and engine compartment 5, to discharge through ports in the downwardly inclined end of the partition 10, in front of and spaced forwardly from the downwardly extending debris and stone deflector panel 15a–15b. This deflector panel also closes the space between the forward end of the inertial separator supporting partition 15 and the motor and fan partition 10.

As shown in FIGS. 1, 2 and 3, the inertial dust separators 19 are mounted in the low-pressure compartment 17 in aligned, spaced end to end relation in pairs, fixed in spaced side by side relation on the supporting platform or partition 15, and directly over the lower debris and dust collecting chamber 18. The axes of the pairs of separators 19 are parallel and extend transversely across the compartment 17, from side to side thereof.

As seen in FIGS. 4 and 5 the separators 19 each comprise elongated cylindrical swirl portions 40–41 with tangential dust, heavier particle and air outer volute or eccentric end portions, or inlet swirl chambers 42–43 at the opposite ends thereof for swirling the incoming dust, air and heavier particles around the interior, to provide a cleaner central air column which is drawn out through the concentric nozzles 45 under the influence of the relative low pressure in the upper compartment 17. Dust, dirt and some heavier small particles are drawn upwardly through the openings or passages 20 tangentially into the enlarged eccentric swirl chambers 42–43. The separators 19 therefore each comprise the elongated aligned right and left hand cylindrical swirl sections 41 and 40, as seen in FIG. 4.

These sections 40 and 41 are flanged outwardly at their adjacent ends and secured to each other in spaced relation by an outwardly flanged intermediate semicircular U-shaped dust and heavier particle collection chamber and discharge chute 35, shown in section in FIG. 5 and having a greater radius and width than the inner radius of the adjoining cylindrical portions 40 and 41. The ends and sides of the semicylindrical portion of the dust and particle collection and discharge chute are indicated generally at 35b, and extend downwardly between the annular flanged ends 35a of the cylindrical portions 40 and 41, and are secured to these flanged end portions by any suitable means, such as bolts 35c, and each form a wide downwardly extending trough or chute resting on the partition or platform 15 and support the centers of the separators 19, and register with similar size discharge openings 36 extending through the partition or platform 15, as best seen in FIG. 5.

Elongated closed heavier particle receiving and collection or settling troughs 38 extend downwardly from the platform 15, as shown in FIGS. 3 and 5, and extend longitudinally under the discharge chutes 35 and openings 36, and are closed at their front ends, as seen in FIG. 1, by the downwardly projecting deflector panels 15a, 15b while the rear ends of the troughs 38 are closed by the clean out door 18a.

A pair of dust recirculating and collection units or vacuum pumps 31 are disposed on the partition 10, forwardly of the deflector panels 15a–15b, as shown in FIGS. 1 and 2. A dust suction conduit 37 from each of the pump intakes extends downwardly through the front end of the supporting partition into the front end of each trough 38 to withdraw air, and lighter dust particles from the troughs 38 and produce a low-pressure condition in the troughs 38 to provide a low pressure in the semicircular dust collection troughs 35 in the separators 19.

A discharge conduit 33 extends from the discharge outlets of the pumps 31 downwardly, for instance as shown in FIGS. 1 and 2, through the compartment 5 and discharges into the dust and debris collection chamber 18 between the bottoms of the troughs 38 and the bottom of the chamber.

Located under the troughs 38 and covering the entire upper portion of the dust and debris collection chamber 18, extending between the opposite sides, and between the downwardly extending stone and debris deflector panel portion 15b and the clean out door 18a is a rectangular frame screen member 16 as seen in FIGS. 1 and 3. The screen frame 16 is suitably supported on the sides of the chamber 18 above the dust and air discharge outlets from the pumps 31 and has a suitable size mesh to prevent larger particles, which are discharged into the chamber 18, from being recirculated through the separators 19.

The interior of the upper or low-pressure compartment 17 is accessible through openings closed by removable closures 17a and 17b. The troughs 38, top of the screen 16, and lower portion of the chamber 18 are accessible through the rear door closure 18a, preferably hinged at its top, so that if the body is mounted on a dump truck the entire contents of stones, debris, and dust will discharge by gravity when the body is raised. The screen member 16 is preferably reinforced by suitable channel frame members 16a and may be supported at its opposite sides by supports such as indicated at 16b, projecting from the sides of the body.

For purposes of exemplification, a particular embodiment of the invention has been shown and described to the best understanding thereof. However, it will be apparent that minor changes and modifications in the arrangement and construction of the parts thereof may be resorted to without departing from the true spirit and scope of the invention as defined in the accompanying claims.

What is claimed is:

1. An inertial dust and debris separator and surface cleaning apparatus comprising a mobile support for travel over the surface to be cleaned, a closed housing thereon having a closed low-pressure upper compartment and a lower closed dust and debris collection chamber, vacuum pump exhaust means in said housing connected for withdrawing air from said upper low-pressure compartment and exhausting the same out of said housing, a horizontal supporting partition separating said closed upper low-pressure compartment from said lower closed chamber, a plurality of aligned pairs of elongated inertial cylindical dust separators mounted in said upper compartment on said partition in side by side spaced parallel relation, each separator comprising axially spaced eccentric tangential dust and air intake chambers having tangential dust and air intake ports, said partition having air and dust intake ports therethrough opening upwardly into said tangential dust and air intake ports, aligned cylindrical dust and air swirl sections extending from said eccentric dust and air intake chambers toward each other, in aligned spaced relation, a semicircular inertial dust collecting trough and discharge chute secured between the adjacent ends of said aligned cylindrical swirl sections having a greater semicircular radius than the inner radius of said cylindrical swirl sections with the sides and ends thereof extending downwardly between said adjacent spaced ends of said cylindrical swirl sections to said partition for receiving dust from said cylindrical swirl sections and discharging the same downwardly toward said supporting partition, said supporting platform having an elongated dust discharge opening therethrough into said closed lower chamber in register with the interior of the lower ends of said semicircular dust collecting trough downwardly extending discharge chute, a dust and debris pickup suction unit carried under said mobile support to traverse the surface being cleaned, suction conduit means extending upwardly from said pickup suction unit having a discharge outlet opening into said lower chamber adjacent the top and front end thereof, a stone, debris, and dust deflector panel extending downwardly from said partition in front of said discharge outlet, in spaced relation thereto, for deflecting the discharge from said suction conduit means downwardly into said lower dust and debris collection chamber, an elongated closed dust and lighter particle collection trough fixed under said partition immediately below said elongated dust discharge opening through said partition for receiving dust therein from said semicircular dust receiving trough and discharge chute, said last mentioned trough being closed at one end by said stone and dust deflector panel, an openable clean out closure at the rear end of said lower chamber closing the other end of said elongated closed trough, a rectangular frame screen member extending completely across said lower chamber below said troughs, from end to end and side to side thereof adjacent said deflector panel at one end and adjacent said clean out closure at its opposite end, suction pump means fixed in said housing having a suction intake port in communication with the interior of said closed troughs and having suction discharge means opening in communication with the interior of said closed lower dust and debris collection chamber, below said rectangular frame screen member.

2. An inertial dust and debris separator and surface cleaning apparatus, as set forth in claim 1 in which the adjacent spaced ends of the aligned cylindrical dust and air swirl sections are flanged outwardly and the radius of the semicircular portion of said dust collecting trough is greater than the radius of said cylindrical swirl sections, and the opposite sides of the trough member are secured to the said outwardly flange portions and formed with circular openings in said opposite sides having diameters not less than the internal diameters of the adjacent ends of said cylindrical swirl sections.

3. An inertial dust separator apparatus as set forth in claim 2 in which the side and end walls of the semicircular dust collecting trough extend downwardly in substantially parallel relation to each other to said supporting partition to provide a substantially uniform, rectangular in cross section, dust discharge chute having a cross sectional area extending downwardly between said adjacent flanged ends of said cylindrical swirl sections to and through said partition into said elongated closed dust and lighter particle collection troughs.

4. An inertial dust and debris separator and surface cleaning apparatus as set forth in claim 3, in which said dust and lighter particle receiving troughs are substantially U-shape in cross-section having elongated parallel side walls extending upwardly in said lower chamber to the bottom surface of said partition in parallel planes at the opposite sides of said semicircular dust collecting trough discharge chutes.

5. An inertial dust and debris separator and surface cleaning apparatus as set forth in claim 4 in which said suction pump means are fixed in said low-pressure compartment on said partition in front of each pair of said inertial dust separators and each includes a suction inlet and a dust discharge outlet, a suction conduit from the suction inlet of each pump extends through said stone deflector panel into the front end of each elongated closed lighter particle receiving trough for withdrawing dust from said troughs, a discharge conduit from the discharge outlet of said pump opening in communication with the front end of said dust and debris collection chamber for lowering the pressure in said troughs, to withdraw dust and air from said troughs and discharge the same into said chamber below said rectangular frame screen member.

6. Apparatus as set forth in claim 5 in which said screen frame member is comprised of a flat rectangular screen disposed in parallel spaced relation in said closed lower dust and debris collection chamber in a plane substantially parallel to the bottoms of said elongated closed troughs, and above the discharge outlets from said discharge conduits from said suction pump means, said screen frame member having a suitable mesh for deflecting stones, debris, and larger particles discharged into said chamber to prevent the same from being withdrawn from said chamber through said air and dust intake ports in said partition into said tangential dust and air intake ports in said eccentric tangential dust and air intake chambers at the opposite ends of said inertial dust separators on said partition.

7. Apparatus as set forth in claim 5 in which a door like closure member for the rear end of said lower dust and debris collection chamber is hinged at the rear end of said housing and substantially engages the back ends of said elongated rectangular troughs to form the rear end trough closure, and substantially engages the rear end of said screen frame member when said closure member is closed, said door like closure being openable away from the rear end of said housing to open the rear ends of said troughs, the top of said screen frame member and the interior of said dust and debris collection chamber for access thereto, and removal of stones, debris, heavier particles and accumulated dust from said chamber.

References Cited

UNITED STATES PATENTS 3,379,011    4/1968    Von Ohain et al.
3,406,423   10/1968    Young _____ 15—347 X ROBERT W. MICHELL, Primary Examiner U.S. Cl. X.R.

15—352; 55—337, 349, 432